(12) United States Patent
Gold (10) Patent No.: US 6,420,842 B1
(45) Date of Patent: *Jul. 16, 2002

(54) EXCITER AND ELECTRONIC REGULATOR FOR ROTATING MACHINERY

(75) Inventor: Calman Gold, Londonderry, NH (US)

(73) Assignee: American Superconductor Corporation, Westborough, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/480,430

(22) Filed: Jan. 11, 2000

(51) Int. Cl.[7] ................................. H02P 7/34

(52) U.S. Cl. ................... 318/141; 318/154; 307/113; 363/98

(58) Field of Search ..................... 318/140–159; 363/21, 97, 98, 14, 141, 75; 307/113, 125; 335/216; 357/83, 80, 81; 505/150; 327/368; 361/19, 58, 141; 156/345; 216/68; 323/360; 324/127, 248

(56) References Cited

U.S. PATENT DOCUMENTS

| | | | | |
|---|---|---|---|---|
| 3,835,369 A | * | 9/1974 | Zoleta | |
| 4,045,716 A | * | 8/1977 | Bartram et al. | |
| 4,175,230 A | | 11/1979 | Richards et al. | ............ 250/199 |
| 4,336,561 A | * | 6/1982 | Murphy | |
| 4,659,973 A | | 4/1987 | Stich | ......................... 318/718 |
| 4,866,373 A | * | 9/1989 | Harada et al. | |
| 5,181,170 A | * | 1/1993 | Huang et al. | |
| 5,194,803 A | * | 3/1993 | Visser et al. | |
| 5,248,941 A | * | 9/1993 | Lee et al. | |
| 5,414,586 A | * | 5/1995 | Hara et al. | |
| 5,532,638 A | * | 7/1996 | Kubo et al. | |
| 5,625,548 A | * | 4/1997 | Gold et al. | |
| 5,642,249 A | * | 6/1997 | Kuznetsov | |
| 5,682,304 A | * | 10/1997 | Shteynberg | |
| 5,726,873 A | * | 3/1998 | Gold et al. | |
| 5,828,146 A | | 10/1998 | Lorenz etr al. | ........... 310/68 D |
| 5,942,997 A | * | 8/1999 | Silver et al. | |
| 5,953,224 A | * | 9/1999 | Gold et al. | |
| 5,965,959 A | * | 10/1999 | Gamble et al. | |
| 6,066,948 A | * | 5/2000 | Seppa | |
| 6,143,129 A | * | 11/2000 | Savas et al. | |
| 6,157,094 A | * | 12/2000 | Gamble et al. | |

FOREIGN PATENT DOCUMENTS

| | | |
|---|---|---|
| DE | 1 955 697 | 5/1971 |
| DE | 40 34 578 A1 | 5/1992 |
| DE | 195 07 760 A1 | 9/1996 |
| EP | 0 852 368 A1 | 7/1998 |
| FR | 2 566 572 | 12/1985 |
| JP | 2-32784 | 2/1990 |
| JP | 4-145899 | 5/2002 |

* cited by examiner

Primary Examiner—Robert E. Nappi
Assistant Examiner—Rita Leykin
(74) Attorney, Agent, or Firm—Fish & Ricahardson P.C.

(57) ABSTRACT

An exciter assembly for supplying power to a superconducting load, such as a superconducting field coil, disposed within a cryogenic region of a rotating machine. The exciter assembly provides an efficient and reliable approach for transferring the electrical power energy across a rotating interface and for controlling the ramp up and regulation of field excitation current in the field coil. In particular, the invention provides a controlled recirculation path for current flowing through the field coil. The exciter assembly includes a transformer having a primary winding and a secondary winding, a sensor which provides a control signal indicative of the flow of field excitation current to the superconducting load; and a current regulator which is disposed in the rotating reference frame and, on the basis of the control signal, regulates the field excitation current to a predetermined set. One of the primary and secondary windings is positioned in a rotational reference frame relative to the other of the primary and secondary windings.

18 Claims, 5 Drawing Sheets

EXCITER AND ELECTRONIC REGULATOR FOR ROTATING MACHINERY

This invention arose in part out of research pursuant to Contract No. F336 15-99-C-2970.

TECHNICAL FIELD

This invention relates to controlling the flow of current to windings used in rotating machinery, and more particularly to controlling the flow of current to superconducting windings.

BACKGROUND

Superconducting windings are being used in electrical machinery and rotating machines because of their low loss characteristics. While the superconducting windings are maintained at cryogenic temperatures, the power supplies used to drive the superconducting windings are typically maintained at ambient temperatures (300° K).

In the design of electrical machinery, incorporating high temperature superconducting (HTS) windings (i.e., motors, generators, magnets), the heat leak associated with the leads carrying current from the power supply at ambient temperatures to the cryogenically cooled windings is an overriding design factor which dictates the cost and thermal capacity of closed-cycle cryogenic cooling apparatus. These losses increase as the temperature difference between ambient and coil temperature increases. A number of approaches have been suggested to minimize the impact of heat leaks in such systems especially those in which the leads carry currents approaching 1 KA. Unfortunately, where vapor cooling of leads is not an option, these approaches introduce high voltages into the system or do not eliminate the need for a high current lead pair entering the cryogenic environment with attendant heat leaks. In cases where the superconducting coil is rotating with respect to a warm stator coil, the problem of heat leaks into the cryogenic environment becomes more critical due to the design constraints imposed by the thermal path impedance of a stationary cryocooler coupled indirectly to a rotating heat load or constraints on the size, weight, and thermal capacity of a rotating cryocooler.

There exist a number of large scale commercial and defense applications of HTS coils (e.g., magnet systems, generators and synchronous motor field windings) which require relatively constant magnetic fields, and in which ample time is available to ramp the coil current up to its initial desired value prior to regulated operation. In electrical machine systems incorporating HTS windings, the current in the HTS coil is subject to flux creep due to the finite losses in the HTS conductor. The dissipation due to this finite albeit small resistive loss requires that the current be restored periodically, i.e., "pumped" via regulating circuitry back to its desired level. The energy input requirement is only that required to make up for the flux creep. Electronic circuits and mechanisms, which perform these functions, are referred to as "flux pumps".

SUMMARY

The invention features an exciter assembly and approach for supplying power to a superconducting load, such as a superconducting field coil, disposed within a cryogenic region of a rotating machine. The exciter assembly provides an efficient and reliable approach for transferring the electrical power energy across a rotating interface and for controlling the ramp up and regulation of field excitation current in the field coil. In particular, the invention provides a controlled recirculation path for current flowing through the field coil.

In one aspect of the invention, the exciter assembly includes a transformer having a primary winding and a secondary winding, a sensor which provides a control signal indicative of the flow of field excitation current to the superconducting load; and a current regulator which is disposed in the rotating reference frame and, on the basis of the control signal, regulates the field excitation current to a predetermined value. The secondary winding is positioned in a rotational reference frame relative to the primary winding.

In essence, the current regulator provides a controlled recirculation path for current flowing through the super conducting load. By monitoring the flow of excitation of current in the load, once the desired level of current is provided in an initial charge up period, current to the load need only be provided relatively infrequently and for very short durations. The persistence characteristic of the coil current achieved in the power electronic control permits the exciter primary side source of AC signal to be turned off during the persistence phase. This reduces both core and winding losses and thus permits a considerably reduced winding rating in the exciter transformer. Moreover, by intelligently controlling the flow of current, the size, weight, and voltage rating of associated components for providing power (e.g., exciter transformer) can be significantly reduced, thereby increasing the overall efficiency and decreasing the cost of the system. This approach for supplying power to superconducting loads is particularly well suited for HTS superconducting rotating machines, such as those described in co-pending applications, Ser. No. 09/415, 626, entitled "Superconducting Rotating Machines", filed Oct. 12, 1999, and Provisional appl. No. 60/266,319 , entitled "HTS Superconducting Rotating Machine", filed Jan. 11, 2000, both of which are incorporated by reference.

Embodiments of this aspect of the invention may include one or more of the following features.

The current regulator includes a first switching device in series between the secondary winding and the superconducting load, a second switching device in parallel with the superconducting load and between the first switching device and superconducting load, and a capacitor disposed in between the secondary winding and the first switching device and in parallel with the second switching device. The first switching device is closed when the second switching device is open to provide recharging current to the superconducting load, and the second switching device is closed when the first switching device is open to shunt current for recirculation through the superconducting load.

In one embodiment, the first and second switching devices are disposed within the cryogenic region, for example, the same region within which the superconducting load is disposed. In this case, the first and second switching devices are preferably metal oxide semiconductor devices. Cryogenic cooling of metal oxide semiconductor devices has been shown to decrease their on-resistance characteristics, thereby further reducing losses in the recirculation loop.

In an alternative embodiment, the current regulator is disposed in a non-cryogenic environment. Thus, cryogenic cooling is limited solely to the superconducting load. Such an arrangement allows the use of higher voltage semiconductor devices including an insulated gate bipolar transistor and a fast recovery rectifier for the first and second switching devices, respectively. Complexity of the assembly and associated drive electronics is reduced because large power blocks can be used instead of array of MOSFETs. Although more power is dissipated in the higher voltage, non-cryogenically cooled devices, the power is dissipated outside of the cryogenic environment and sufficient mass is available to cool the devices without complex thermal management. Moreover, in the event of failure of the switching devices or associated electronics, repair and maintenance is facilitated since there is no need to open the cryostat to gain access to the switching devices.

The load is a superconducting coil including high temperature superconductor. The primary winding is in the form of a stationary disk and the secondary winding is in the form of a rotatable disk axially spaced from the stationary disk to form a gap therebetween. In essence, the rotating disk and stationary disk provide a transformer for inducing AC voltage and current in the superconducting load. In one embodiment, the stationary disk and the rotatable disk are formed of radial laminations.

In all of the embodiments described above, the exciter assembly can further include a resistive load and a switch for allowing energy from the superconducting load to flow to the resistive load in the event of a detected fault.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
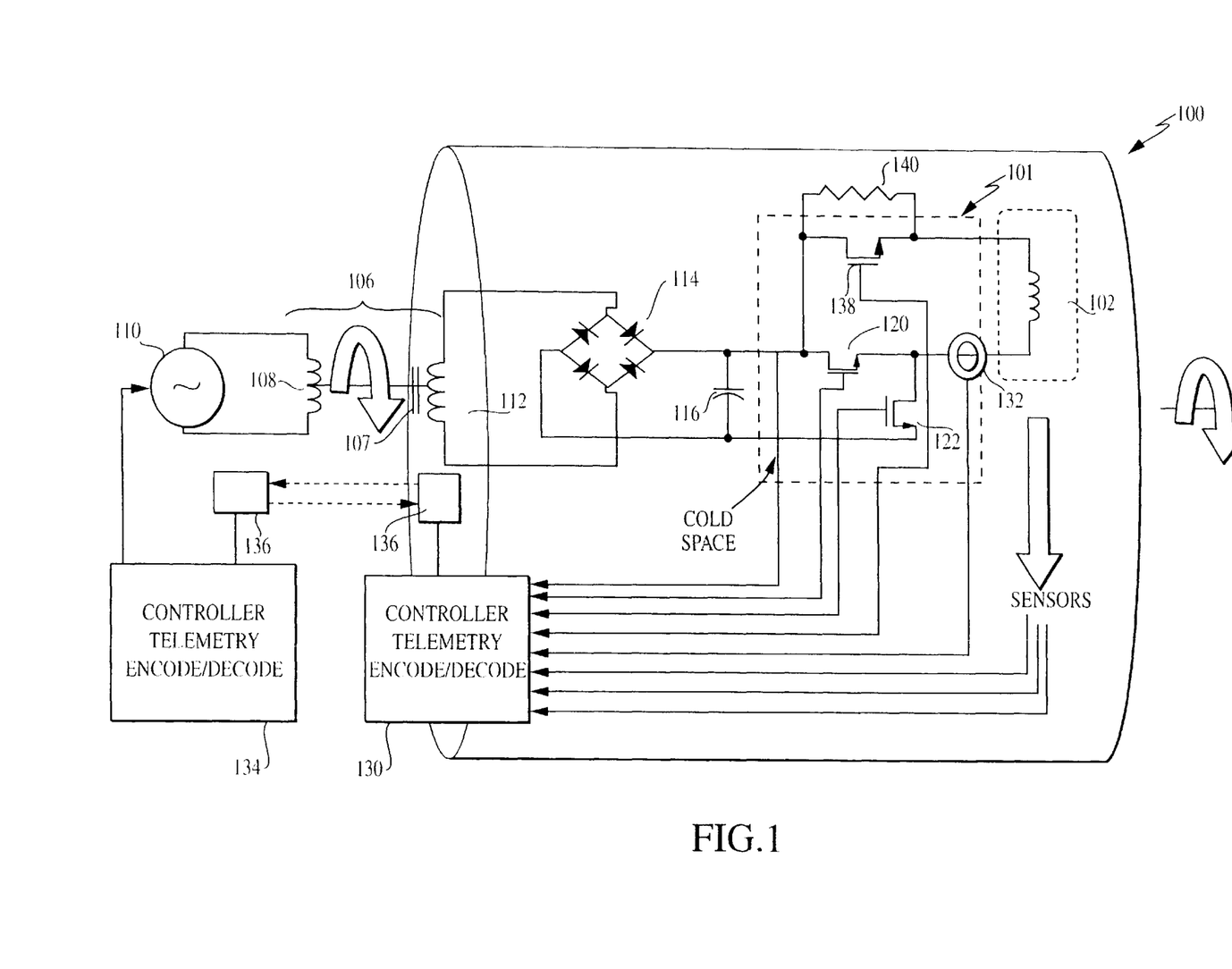
FIG. 1 is a schematic representation of a brushless exciter and regulating circuit in accordance with the invention.

Referring to FIG. 1, a brushless exciter assembly 100 includes a regulating circuit 101 for use with superconducting rotating machinery is shown. In general, the brushless exciter assembly 100 provides the necessary electrical energy to one or more superconducting field windings, for example, windings of a rotor assembly. The superconducting field windings are represented here by an HTS field coil 102 and may be in any of a wide variety of configurations including layer-wound or pancake coils. Field coil 102 is maintained within a cryogenic chamber (e.g., cryostat) of the rotor assembly. The cryogenic chamber (not shown) maintains field coil 102 at temperatures conducive to superconduction (e.g., 20°–110° K). One example, of a superconducting field winding having a configuration well suited for use in a rotating machine is described in the above referenced application Ser. No. 09/415,626, entitled "Superconduction Rotating Machines" filed Oct. 12, 1999. More particularly, the brushless exciter assembly provides the energy across a rotating reference interface to field coil 102 of the rotor assembly.

As shown in FIG. 1, brushless exciter assembly 100 includes a transformer 106 having a primary winding 108 for receiving current from an AC power source 110 and a secondary winding 112. AC power source 110 is preferably a high frequency excitation source (e.g., 400 Hz to 2 KHz) to permit reduction of the core cross-section and mass of transformer 106. In one embodiment, transformer 106 includes a core 107 constructed of segmented sections of distributed air-gap pressed powder core material, such as powdered iron U-cores. In this case the core segments are separated by air gaps and the core segments are disposed in a radial direction and lie in an angular relationship with respect to one another to form "circular disk" of the transformer core. Brushless exciter assembly 100 also includes a full-wave bridge rectifier 114 connected to secondary winding 112 for rectifying the AC current and providing the DC current required by field coil 102 and a storage capacitor 116. In essence, brushless exciter assembly 100 serves as a "flux pump" for transferring power across the cryogenic barrier in the absence of conductive leads or joints.

Figure 2:
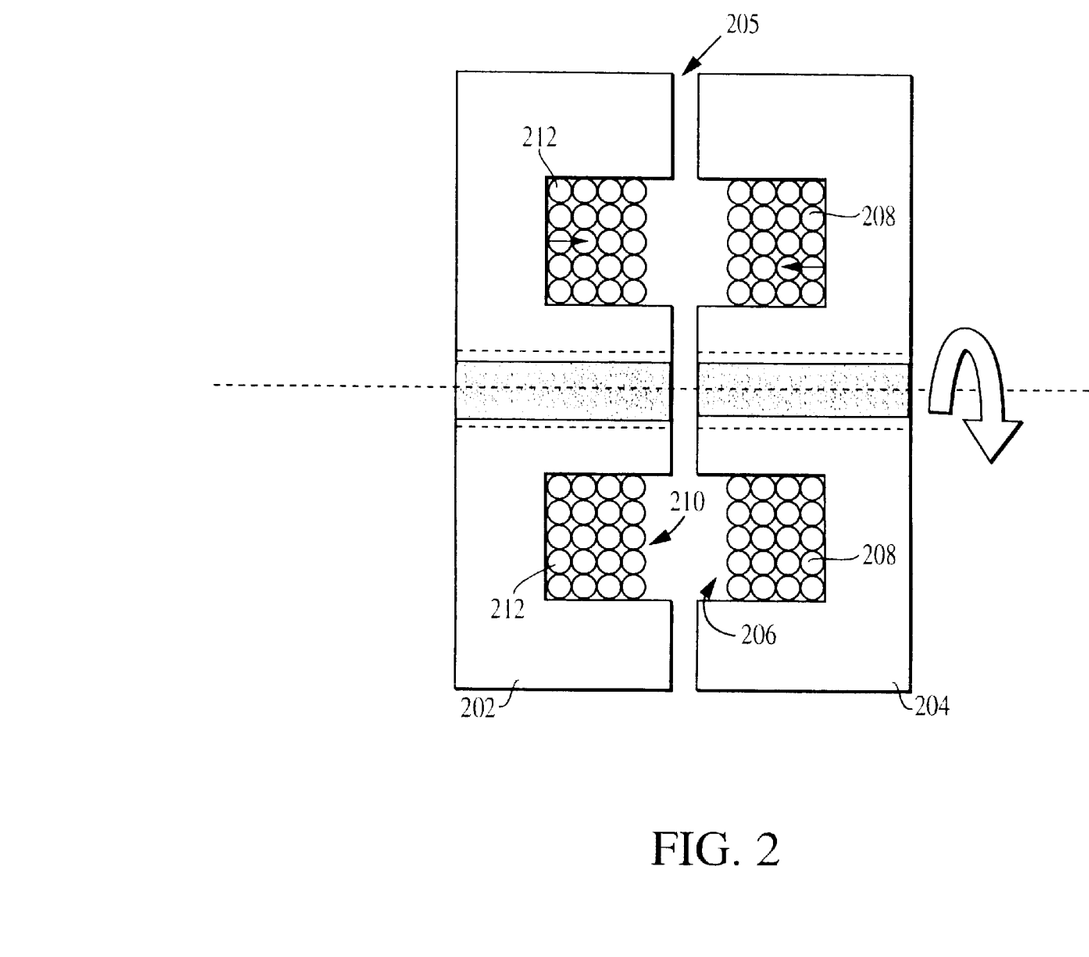
FIG. 2 is a diagrammatic representation of a transformer of the brushless exciter assembly of FIG. 1.

Referring to FIG. 2, primary winding 212 and secondary winding 208 (structural equivalents of primary winding 108 and secondary winding 112 in FIG. 1) include a stationary core 202 and a rotating core 204, respectively. Stationary core 202 is spaced from rotating core 204 by an air gap 205 (e.g., 1–4 mm) and may be mounted, for example, to the stator assembly of the rotating machine. Rotating core 204 is formed of a high permeability material (e.g., iron) and includes a groove 206 within which a coil winding 208 is disposed. Stationary core 202 is similarly formed of a high permeability material and includes a groove 210 within which a coil winding 212 is disposed. To reduce eddy currents, rotating core 204 and stationary core 202 are formed as laminations separated by varnish or oxide.

Cores 202, 204 are positioned such that winding 208 is positioned directly across from winding 212. Each of the coil windings is wound from a continuous insulated copper wire.

Thus, the disk arrangement provides transformer 106 having secondary winding 112 rotating relative to primary winding 108 of the transformer (or vice versa). An important feature of this particular arrangement is that the flux linkage generated by stationary core 202 and rotating core 204, when stationary, is the same as when the rotating core rotates. In other words, transformer 106 has a design having a rotation invariant coupling between the primary winding and the secondary winding. That is, the induced voltage is independent of rotational speed and instantaneous position of primary windings relative to secondary windings. This feature advantageously allows field coil 102 to be charged prior to rotating core 204 rotating (i.e., before rotating machine operates).

Referring again to FIG. 1, regulating circuit 101 includes a pair of MOSFET switching devices 120, 122 arranged in a half bridge arrangement similar to a synchronous step-down ("buck") DC-DC converter topology. In this embodiment, however, the conventional LC output filter has been replaced with field coil 102 with the converter used to regulate the average field excitation current.

As in any superconducting magnet coil, the HTS field coil must be monitored for incipient quench and a provision must be made to dump the energy stored in the coil in sufficient time to prevent catastrophic failure. Thus, to address this concern, the persistence of an additional switching device 138 in series with the coil. Thus, switch 138 is normally closed and shunts out a dump resistor 140 used to dissipate energy from field coil 102 in the event of a quench. That is, in normal operation, switching device 138 is normally conducting to allow current to bypass dump resistor 140, which is preferably positioned outside the cold space of the rotor assembly.

Further, in this embodiment, MOSFET devices 120, 122 are n-channel enhancement mode devices exhibiting low on-resistance and supporting the maximum reverse voltage in the voltage regulator without breakdown. Moreover, MOSFET devices are cryogenically cooled to advantageously decrease its on-resistance, but at the expense of reducing its operating voltage rating (e.g., as much as 20%). In certain embodiments, to further decrease the on-resistance of the MOSFET switching devices, several MOSFET devices are connected in parallel. Indeed, many MOSFET devices can be combined in a large parallel array.

Field current controller 130 contains a pair of gate driver circuits for controlling the respective gates of MOSFET devices 120, 122. The gate drivers are responsive to logical control signals, one being the inversion of the other. In embodiments in which MOSFET devices 120, 122 are cryogenically cooled it is generally preferable to cryogenically cool field current controller 130 as well.

In operation, alternating current supplied from AC power source 110 induces a changing magnetic field in primary winding 108 which, in turn, induces alternating current flow in secondary winding 112. Rectifier 114 converts the alternating current induced in secondary winding 112 into direct current. The direct current is selectively transferred to field coil 102 by MOSFET devices 120, 122. In particular, MOSFET devices are controlled by controller 130 to alternately (1) provide charging current to field coil 102 ("ramping" mode) and (2) recirculating current in the field coil ("persistence" mode).

In ramping mode, MOSFET device 122 is closed, while MOSFET device 120 is open. As a result, DC current from rectifier 114 (and capacitor 116) is applied to field coil 102, thereby ramping up the current flow. In ramping mode, the DC current is supplied until the desired current levels within field coil 102 are achieved, at which time the respective states of MOSFET devices 120, 122 are changed to place voltage regulator into persistence mode.

In persistence mode, MOSFET device 122 is open, while MOSFET device 120 is closed to shunt current flowing through field coil 102. At cryogenic temperatures, field coil 102 is superconducting and has a relatively low loss. Thus, aside from the low loss of the field coil, a substantial portion of loss in the persistence mode is attributable to MOSFET device 120. MOSFET device 120 is designed for minimum voltage drop since it carries current for a majority of the time (the field coil 102 presumably reasonably persistent). Further details of the operation of a switching circuit operated in accordance with alternating ramp up and persistence modes is described in U.S. Pat. No. 5,965,959, assigned to the assignee of the present invention, and incorporated herein by reference.

It is appreciated that MOSFET switching devices 120, 122 are not active simultaneously. Indeed, simultaneous control is prevented by switching controller 130 and, in accordance with standard practice, a short time interval or "deadtime" is permitted to elapse between the activation of MOSFET devices 120, 122. Furthermore, because operation of MOSFET switching devices 120, 122 is mutually exclusive, in certain embodiments, only one logic signal is required to operate switching control. That is, the gate drive signals provided by switch controller 130 are essentially complementary logic signals.

As discussed above, direct current from rectifier 114 (and capacitor 116) is applied to field coil 102, to ramp up to a final excitation current level in field coil 102 in a relatively short time (e.g., several seconds). At this point, MOSFET switches 120, 122 are switched to place the regulator in persistence mode. Once in the persistence mode the input current flowing through primary winding 108 drops essentially to zero. Switch controller 130 uses a sensing circuit 132 to monitor the current level at field coil 102. Due to the low loss characteristic of the field coil, the field excitation current decays slowly. However, when sensing circuit 130 detects a drop below a predetermined threshold value (e.g., 1% of the final excitation current), MOSFET switch 122 is activated for a very short period (e.g., <10 msecs) to pump the current in field coil 102 back up to the desired final excitation current level. In particular, capacitor 16 discharges for that short period (generally less than ¼ of a sine wave) to pump up field coil 102, at which point MOSFET devices 120, 122 are switched to place regulator back into persistence mode. The field current is periodically restored by controlling the duration of operation the pump switch as required. It will be appreciated that the transfer of energy from the capacitor to the field coil is a resonant discharge of the capacitor. The capacitor cannot be allowed to discharge beyond zero volts or the coil will recharge it in the opposite polarity due to the resonant behavior. Thus, the maximum duration of the restorative operation is one-quarter of the resonant period of the capacitor with the coil inductance. This would also correspond to the maximum increment of current increase in the inductor at the end of the restorative cycle. The controller is programmed to adjust or regulate the incremental change in coil current per pump cycle to be less than the maximum increment available by adjusting the duration of switch operation.

In essence, capacitor 116 serves to provide a "trickle" charge to field coil 102 at relatively infrequent times and for a relatively short duration. For example, field coil 102 may only require tens of milliseconds to pump up with several minutes passing between periods of recirculation. An important advantage of controlling regulating circuit 101 in this way relates to transformer 112. Specifically, because current flows through secondary winding 108 for only very short periods of time, a transformer having a secondary winding with a much lower rating can be used. Indeed, the size and rating of the secondary winding can be selected such that it is allowed to operate above its normal rating for the short period of time needed to charge field coil 102 to its desired value during the initial ramp up period.

A data logging and master motor controller 134 is provided to receive and store data from field current controller 130. Bidirectional communication between field current controller 130 on the rotating side and the data logging and master motor controller 134 on the stationary side of the motor is required. Setpoint commands for controlling the field current must be issued and acted upon by the control electronics and rotating power electronics. While the rotating control is autonomous for any setpoint currently issued, the rotating control must acquire and monitor coil voltage and current for both current regulation and coil protection. Controller 134 must receive telemetry indicating status on the rotating side. This status may include temperatures and other data indicating the condition of the field coil. Field coil controller 130 includes a microcontroller with A/D conversion and digital I/O to locally control the switching devices for regulation of coil current, sense coil conditions, and telemeter data and status to the stationary side.

The bi-directional communication uses pulse code modulated carrier infrared optical transmission and reception. The interface protocol for communicating with controller 134 may thus be made standard RS-232 or RS-485, thus permitting any serial port equipped computer to communicate with the motor. In one embodiment, 56.8 kHz carrier modulated at 1200 baud serial data rate is used. The transmitter and receiver are closely coupled, and the received signal is made rotation invariant, as was the case above with the primary and secondary windings of transformer 106. Rotation invariance is achieved through the use of several synchronously drive 940 nm IR emitters 136 to form an area (ring) light source. The rotating side microcontroller converts acquired signals and transmits digitally encoded data strings to the stationary side on a regularly determined time schedule. Commands from the stationary side are sent to the rotating side as required to change the setpoint for the field current. The communication is half-duplex, thus one wavelength can be used for both transmission and reception across the rotating boundary. It is appreciated that somewhat higher or lower modulation frequencies are useable and that other IR wavelengths are also acceptable.

Figure 3:
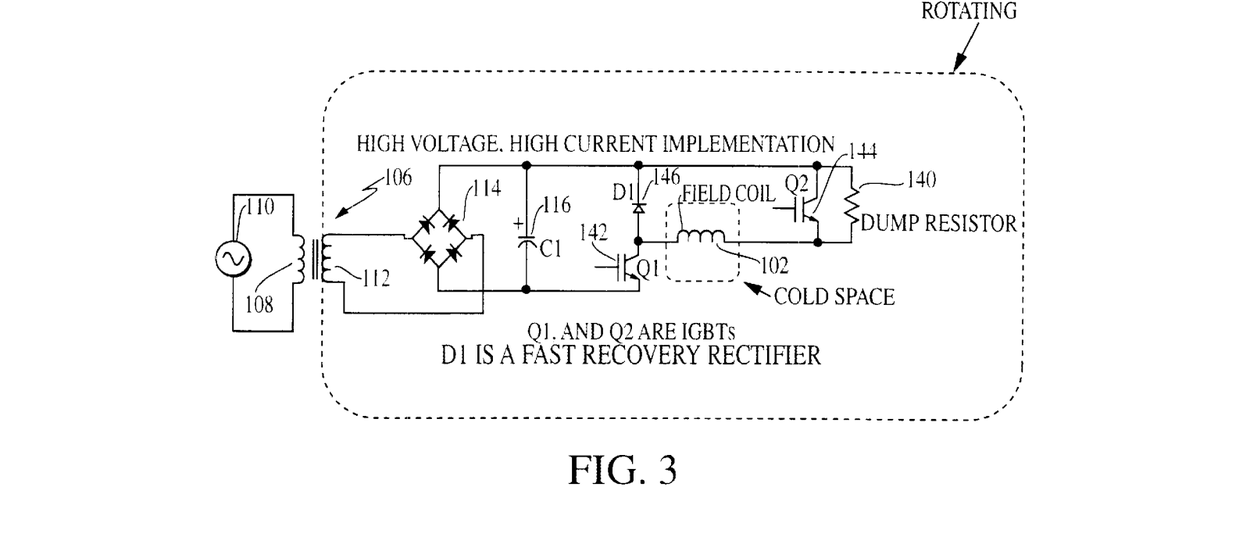
FIG. 3 is a schematic representation of an alternative embodiment of a brushless exciter assembly.

Referring to FIG. 3, in an alternative embodiment, the regulating circuit is removed from the cold space leaving only the field coil within the cryogenic environment. By positioning the electronics outside the cold space allows the use of higher voltage semiconductor devices including IGBTs for the first and second switching devices. For example, as shown in FIG. 3, high power IGBT devices 142, 144 are substituted for the MOSFET devices 120, 138 of the cold embodiment of FIG. 1, respectively. A fast recovery rectifier diode 146 is substituted for MOSFET device 122. One advantage of this embodiment is that complexity of the assembly and associated drive electronics is reduced because large power blocks can be used instead of array of MOSFETs. Although more power is dissipated in the higher voltage, non-cryogenically cooled IGBT devices, the power is dissipated outside of the cryogenic environment and sufficient mass and is available to cool the devices without complex thermal management. Moreover, in the event of failure of the switching devices or associated electronics, repair and maintenance is facilitated since there is no need to open the cryostat to gain access to the switching devices.

In general, the semiconductor switching devices described above have a voltage rating commensurate with the operational voltages of the system. However, it is appreciated that overvoltage protection, such as snubber or clamping circuitry can be incorporated in accordance with well-accepted, standard practices to address transient levels of voltages that may exceed the switching devices rating. Such transients are particularly problematic during the startup in an induction mode of a synchronous motor.

Figure 3A:
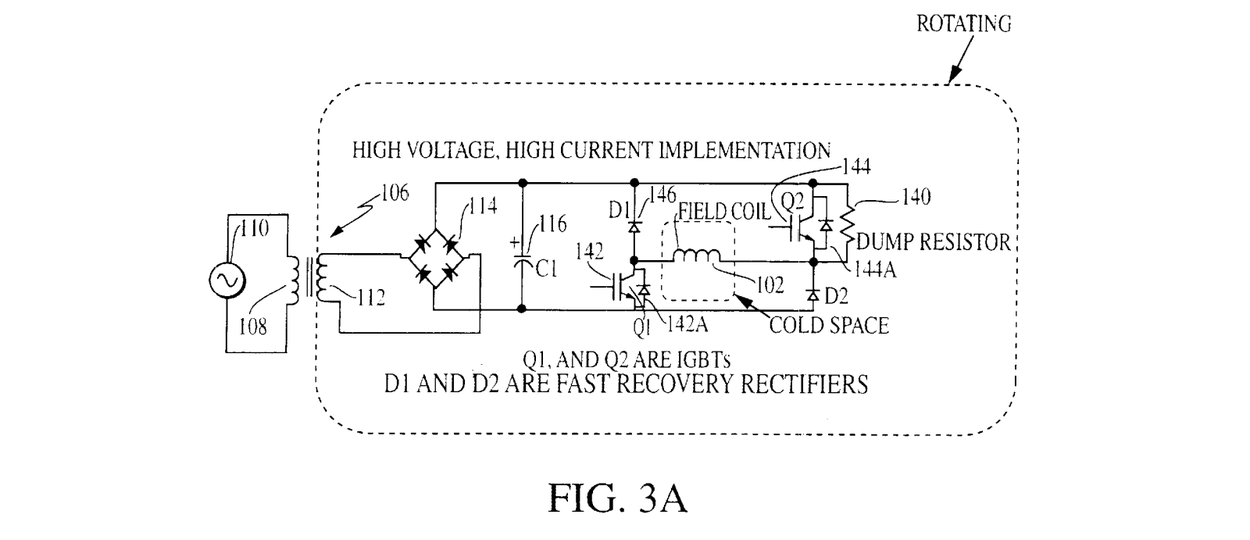
FIG. 3A is a schematic representation of another alternative embodiment of a brushless exciter assembly.

Referring to FIG. 3A, an alternative embodiment of a regulating circuit having an additional fast recovery diode 150 is shown. Diode is 150 generally has a voltage rating identical to that of diode 146. In essence, the addition of diode 150 forms a full-bridge rectifier arrangement which, as will be described below, provides additional advantages. IGBT devices 142 and 144 are also shown to have diodes 142a, 144a, which are typically co-packaged with the IGBT devices. In the MOSFET arrangement of FIG. 1, such diodes are generally in the form of intrinsic drain-to-source diodes.

In operation, when the end of field coil 102 connected to IGBT device 140 is positive relative to the end of the field coil connected to IGBT device 142, the co-packaged diodes 140a, 142a would conduct through the filed coil and charge up capacitor 116 during a first half cycle. When the polarity of field coil 102 is reversed in the opposite half cycle diodes 146 and 150 conduct. Thus, as AC current is induced in field coil 102, unipolar DC is produced n capacitor 116 as if secondary winding 112 of transformer 106 was being bridge rectified into capacitor 116. In essence, field coil 102 acts as a source for charging capacitor instead of transformer 106.

This approach is particularly attractive in applications wherein a synchronous superconducting motor is started as an induction motor and then once the shaft speed of the motor reaches a certain threshold level (e.g., measured by a tachometer), the motor is switched into a synchronous mode and ramp up of the field coil is started. Thus, energy can be provided to capacitor 116 (in essence, "precharged") without energy being provided from secondary winding 112. In certain applications, a substantial amount of energy can be stored in capacitor 116 prior to activating source 110.

Figure 4:
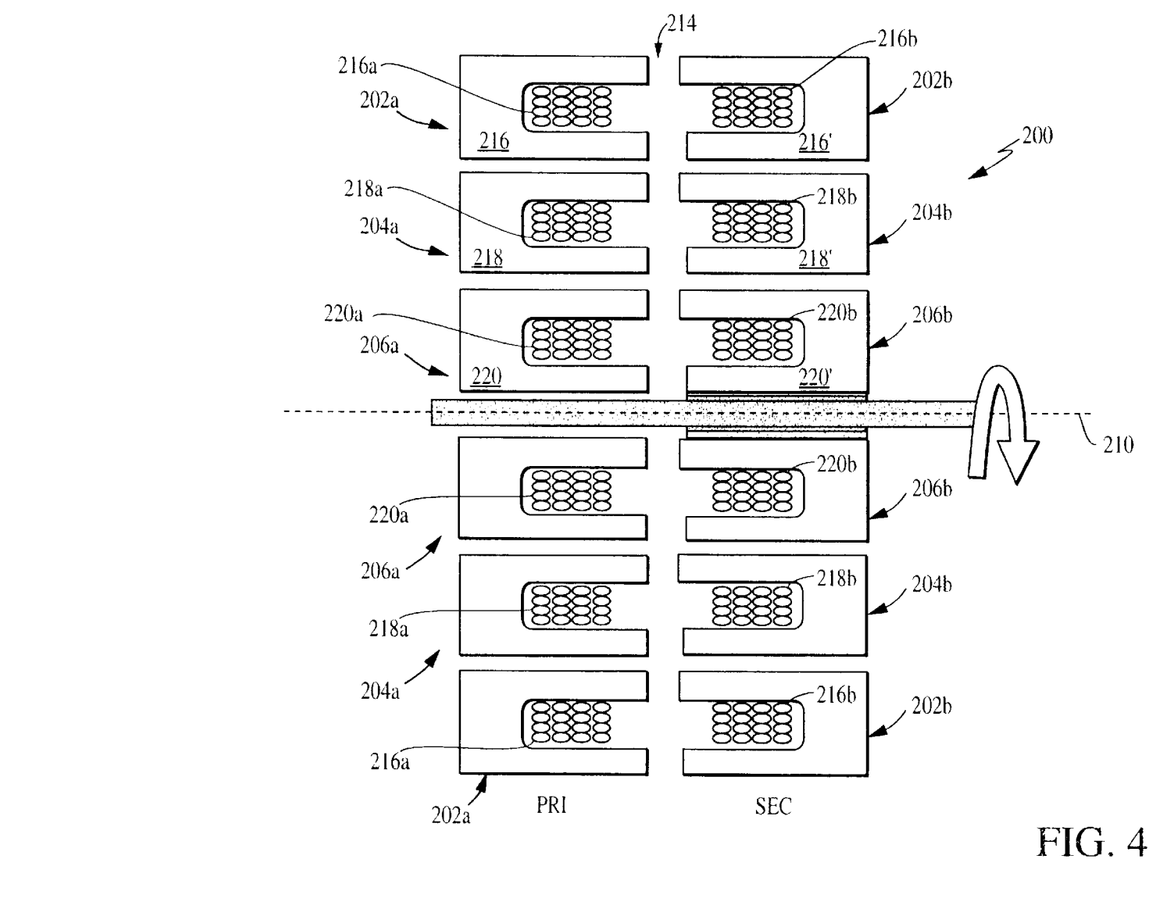
FIG. 4 is a diagrammatic representation of a polyphase transformer used in a polyphase embodiment of the invention.

Referring to FIG. 4, a three-phase exciter transformer 200 is shown to include three primary structures 202a, 204a, 206a and corresponding secondary structures 202b, 204b, 2026b. Primary structures 202a, 204a and 206a are concentrically disposed around a longitudinal axis 210 of the transformer and are radially spaced from each other. Secondary structures 202b, 204b and 206b are similarly positioned around axis 210 and are axially spaced from corresponding primary windings by a gap 214 (e.g., 1–4 mm). Each primary structure includes U-shaped core members 216, 218, 220 formed of a relatively high permeability material for supporting(primary windings 216a, 218a, 220a. The primary windings are positioned in opposing relationship with secondary windings 216b, 218b and 220b supported in U-shaped core members 216', 218', and 220'. The U-shaped core members of the primary structures and secondary structures serve to provide isolation between adjacent windings. Each of primary structures 202a, 204a and 206a are driven by a corresponding phase of a three-phase AC source (not shown). Secondary structures 202b, 204b, and 206b are connected to a conventional solid-state polyphase rectifier.

Figure 5:
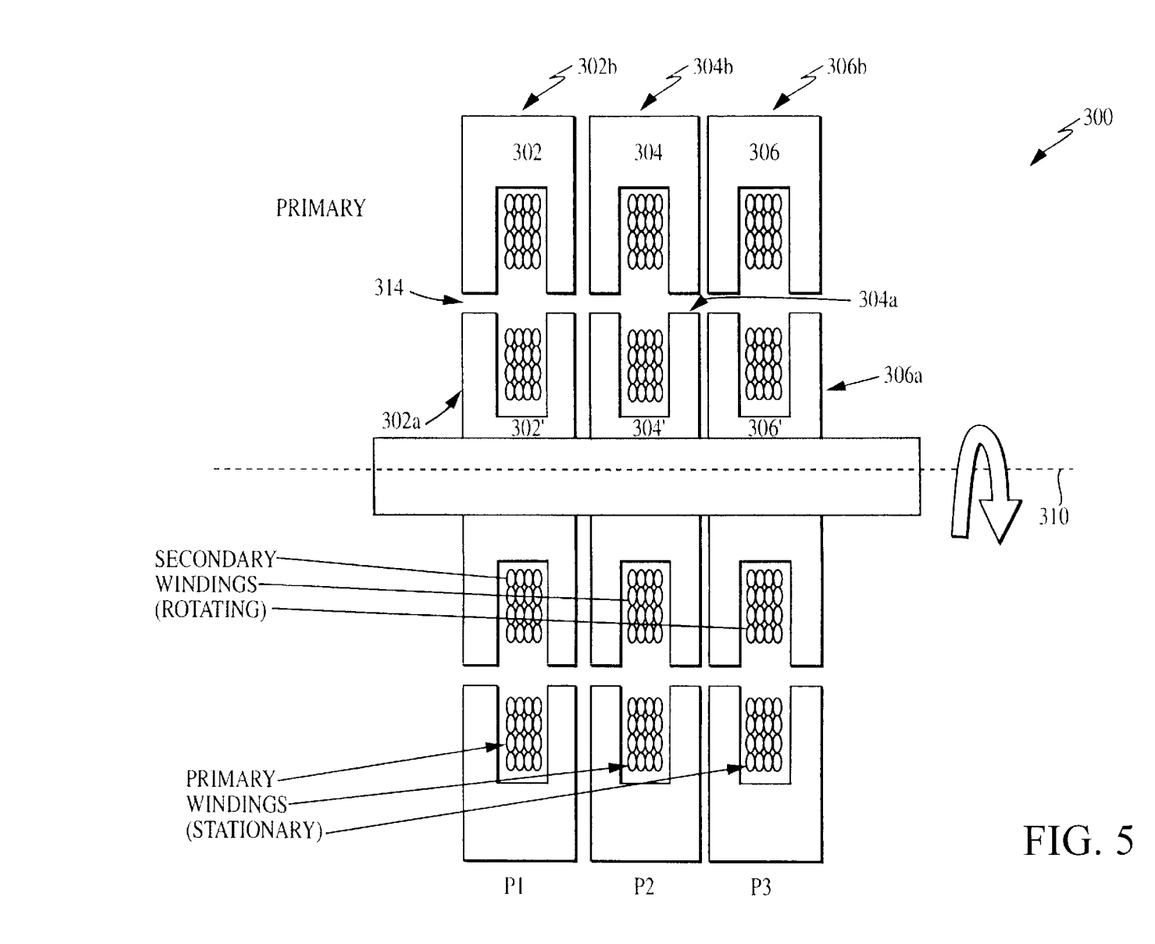
FIG. 5 is a diagrammatic representation of a alternative embodiment of a polyphase transformer.

In an alternative embodiment, a three-phase transformer 300 includes three secondary 302a, 304a, 306a surrounded by three concentrically mounted primary structures 302b, 304b, 306b along an axis 310. As was the case described above, windings of the primary structures are supported by U-shaped core members 302, 304, 306 and windings of the secondary structures are supported within corresponding U-shaped core members 302', 304', and 306'. U-shaped core members 302, 304, 306 are spaced from corresponding U-shaped core members 302', 304', and 306'by a gap 314.

Other embodiments are within the scope of the claims.

What is claimed is:

1. An exciter assembly for supplying power to a superconducting load disposed within a cryogenic region of a rotating machine, the exciter assembly comprising:

a transformer having a primary winding and a secondary winding, one of the primary and secondary windings being positioned in a rotational reference frame relative to the other of the primary and secondary windings;

a sensor which provides a control signal indicative of the flow of field excitation current to the superconducting load; and a current regulator which is disposed in the rotating reference frame and, on the basis of the control signal, regulates the field excitation current to a predetermined value.

2. The exciter assembly of claim 1 wherein the current regulator includes:
   a first switching device in series between the secondary winding and the superconducting load;
   a second switching device in parallel with the superconducting load and between the first switching device and superconducting load;
   a capacitor disposed between the secondary winding and the first switching device and in parallel with the second switching device;
   the first switching device being closed when the second switching device is open to provide recharging current to the superconducting load; and
   the second switching device being, closed when the first switching device is open to shunt current for recirculation through the superconducting load.

3. The exciter assembly of claim 2 wherein the first and second switching devices are disposed within the cryogenic region.

4. The exciter assembly of claim 3 wherein the first and second switching devices are metal oxide semiconductor devices.

5. The exciter assembly of claim 1 wherein the superconducting load is a superconducting coil including high temperature superconductor.

6. The exciter assembly of claim 1 wherein the primary winding is in the form of a stationary disk and the secondary winding is in the form of a rotatable disk axially spaced from the stationary disk to form a gap therebetween.

7. The exciter assembly of claim 6 wherein at least one of the stationary disk and the rotatable disk is formed of radial laminations.

8. The exciter assembly of claim 1 further comprising
   a resistive load; and
   a switch for allowing energy from the superconducting load to flow to the resistive load in the event of a detected fault.

9. The exciter assembly of claim 1 wherein the transformer is a polyphase transformer driven by a polyphase AC Source.

10. The exciter assembly of claim 1 wherein the current regulator is disposed in a non-cryogenic environment.

11. The exciter assembly of claim 10 wherein the current regulator includes:
   a first switching device in series between the secondary winding and the superconducting load;
   a second switching device in parallel with the superconducting load and between the first switching device and superconducting load;
   a capacitor disposed in parallel between the secondary winding and the first switching device;
   the first switching device being closed when the second switching device is open to provide recharging current to the superconducting load; and
   the second switching device being, closed when the first switching device is open to shunt current for recirculation through the superconducting load.

12. The exciter assembly of claim 11 wherein the first switching device is an insulated gate bipolar transistor device and the second switching device is a fast recovery rectifier diode.

13. The exciter assembly of claim 11 wherein the superconducting load is a superconducting coil including high temperature superconductor.

14. The exciter assembly of claim 11 wherein the primary winding is in the form of a stationary disk and the secondary winding is in the form of a rotatable disk axially spaced from the stationary disk to form a gap therebetween.

15. The exciter assembly of claim 14 wherein at least one of the stationary disk and the rotatable disk is formed of radial laminations.

16. The exciter assembly of claim 10 further comprising:
   a resistive load; and
   a switch for allowing energy from the superconducting load to flow to the resistive load in the event of a detected fault.

17. The exciter assembly of claim 10 wherein the transformer is a polyphase transformer drive by a polyphase AC source.

18. The exciter assembly of claim 2, further comprising:
   a resistive load; and
   a third switching device for allowing energy from the superconducting load to flow to the resistive load in the event of a detected fault.

* * * * *